US006699931B2

(12) United States Patent
Kuo et al.

(10) Patent No.: US 6,699,931 B2
(45) Date of Patent: Mar. 2, 2004

(54) MODIFIED ALKYD COMPOSITIONS COMPRISING DIOL LATEX COMPOSITIONS AND PROCESSES OF MAKING THE SAME

(75) Inventors: Thauming Kuo, Kingsport, TN (US); John David Moncier, Church Hill, TN (US); Allan Scott Jones, Wonder Lake, IL (US); David Logan Murray, Fall Branch, TN (US); Mahendra Kumar Sharma, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 10/094,355

(22) Filed: Mar. 8, 2002

(65) Prior Publication Data

US 2003/0018110 A1 Jan. 23, 2003

(Under 37 CFR 1.47)

Related U.S. Application Data

(60) Provisional application No. 60/282,612, filed on Apr. 9, 2001.

(51) Int. Cl.$^7$ ............................................... C08G 63/02
(52) U.S. Cl. ..................... 524/604; 524/560; 524/561; 524/562; 524/601; 524/605; 524/764; 528/272; 528/290; 528/295; 528/302; 528/308
(58) Field of Search ................. 524/604, 560, 524/561, 562, 601, 605, 764; 528/272, 290, 295, 302, 308

(56) References Cited

U.S. PATENT DOCUMENTS

| 2,683,730 | A | 7/1954 | Seeger et al. |
| 2,950,263 | A | 8/1960 | Abbotsoc et al. |
| 3,012,008 | A | 12/1961 | Lister |
| 3,097,191 | A | 7/1963 | France et al. |
| 3,384,653 | A | 5/1968 | Erner et al. |
| 3,394,164 | A | 7/1968 | McClellan et al. |
| 3,642,964 | A | 2/1972 | Rausch, Jr. et al. |
| 3,644,457 | A | 2/1972 | König et al. |
| 3,779,969 | A | 12/1973 | Slagel et al. |
| 3,883,571 | A | 5/1975 | Allport et al. |
| 3,985,703 | A | 10/1976 | Ferry et al. |
| 4,031,026 | A | 6/1977 | Ibbotson |
| 4,115,429 | A | 9/1978 | Reiff et al. |
| 4,118,411 | A | 10/1978 | Reiff et al. |
| 4,180,494 | A | 12/1979 | Fromuth et al. |
| 4,202,957 | A | 5/1980 | Bonk et al. |
| 4,242,243 | A | 12/1980 | Antonelli et al. |
| 4,273,690 | A | 6/1981 | Walus |
| 4,299,347 | A | 11/1981 | Rougier |
| 4,368,287 | A | 1/1983 | Ishikura et al. |
| 4,376,834 | A | 3/1983 | Goldwasser et al. |
| 4,414,357 | A | * 11/1983 | Wright et al. ............... 524/513 |
| 4,451,596 | A | 5/1984 | Wilk et al. |
| 4,458,050 | A | 7/1984 | Heyman |
| 4,567,236 | A | 1/1986 | Goldwasser et al. |
| 4,810,763 | A | 3/1989 | Mallya et al. |
| 4,885,350 | A | 12/1989 | Yamashita et al. |
| 5,061,766 | A | 10/1991 | Yamashita et al. |
| 5,247,040 | A | 9/1993 | Amick et al. |
| 5,272,204 | A | 12/1993 | Akimoto et al. |
| 5,349,026 | A | 9/1994 | Emmons et al. |
| 5,371,148 | A | 12/1994 | Taylor et al. |
| 5,378,757 | A | 1/1995 | Blount, Jr. et al. |
| 5,409,967 | A | 4/1995 | Carson et al. |
| 5,530,059 | A | * 6/1996 | Blount, Jr. et al. ......... 524/604 |
| 5,652,306 | A | 7/1997 | Gaetan et al. |
| 6,197,878 | B1 | 3/2001 | Murray et al. |
| 6,255,366 | B1 | * 7/2001 | Adams et al. ............... 523/501 |
| 6,262,149 | B1 | * 7/2001 | Clark et al. ................. 523/501 |
| 6,262,167 | B1 | 7/2001 | Weitzel et al. |

FOREIGN PATENT DOCUMENTS

| EP | 255137 | 2/1988 |
| EP | 0 438 215 A1 | 7/1991 |
| EP | 555903 | 8/1993 |
| EP | 982351 | 12/2000 |
| GB | 774868 A | 5/1957 |
| GB | 869144 A | 5/1961 |
| JP | 60040182 AB | 3/1985 |
| JP | 63186703 AB | 8/1988 |
| JP | 64001786 AB | 1/1989 |
| JP | 01123854 AB | 5/1989 |
| JP | 01153249 AB | 6/1989 |
| JP | 01163254 AB | 6/1989 |
| JP | 02016145 AB | 1/1990 |
| JP | 02024346 AB | 1/1990 |
| JP | 02155944 AB | 6/1990 |
| JP | 04335002 AB | 11/1992 |
| JP | 06184217 AB | 7/1994 |
| WO | WO 97/28199 | 8/1997 |
| WO | WO 99/10398 A2 | 3/1999 |
| WO | WO 99/10413 A2 | 3/1999 |
| WO | WO 99/47578 | 9/1999 |

OTHER PUBLICATIONS

Radiation Physics and Chemistry, vol 55, 1999, pp 99–101, XP004162489, p 100, col 1–col 2, par. 2.

U.S. patent application Ser. No. 09/668,449, Sharma et al., filed Sep. 22, 2000.

* cited by examiner

Primary Examiner—David W. Wu
Assistant Examiner—Satya Sastri
(74) Attorney, Agent, or Firm—Michael K. Carrier; Bernard J. Graves, Jr.

(57) ABSTRACT

The present invention relates to modified alkyd polymers, and compositions made from such polymers, wherein the alkyd polymers are modified with polyol-containing latex compositions and/or diol-containing latex compositions. The invention further relates to compositions prepared from such modified alkyd compositions.

64 Claims, No Drawings

MODIFIED ALKYD COMPOSITIONS COMPRISING DIOL LATEX COMPOSITIONS AND PROCESSES OF MAKING THE SAME

CROSS REFERENCE TO RELATED APPLICATIONS

This application claims benefit of priority under 35 USC §119(e) to U.S. Provisional Application No. 60/282,612, filed on Apr. 9, 2001, the contents of which are incorporated herein by reference.

FIELD OF THE INVENTION

The present invention relates to modified alkyd polymers, and to compositions made from such polymers, in which the alkyd polymers are modified with polyol-containing latex compositions and/or diol-containing latex compositions. The invention further relates to compositions prepared from such modified alkyd compositions.

BACKGROUND OF THE INVENTION

Coatings based on alkyds are known to have good application and wetting properties. Coatings based on acrylic (latex) polymers generally have superior film properties such as durability, weathering, and chemical resistance. Accordingly, alkyd compositions modified with latex compositions would be useful to provide combinations of the specific advantages of the two coating types.

One way to accomplish this objective would be to combine in a physical blend an alkyd composition with a latex polymer composition. However, alkyd polymers and latex polymers are not readily compatible, due to their distinctly different chemical structures and molecular weights. Accordingly, it has been determined that physical blends of alkyd polymers and latex polymers often separate, either in the blended composition itself or after the composition has been applied to a substrate. Such separation is due, in part, to the difference in molecular weights of the two materials. Alkyds are generally prepared by polycondensation and typically have molecular weights below 10,000, while latex polymers are addition polymers and typically have molecular weights over 100,000. A blend may be prepared by using a latex polymer having a lower molecular weight. However, this will generally result in poorer coating performance.

Modification of alkyd polymers has also been attempted by polymerizing latex monomers in the presence of alkyd dispersions, as disclosed in U.S. Pat. No. 4,451,596 and European Patent Application No. 0 555 903. Alkyd polymers prepared from these methods contain grafted moieties that are derived from the latex monomers. Coating compositions based on these materials generally have poor reactivity toward oxidative cure due to the presence of low and insufficient amounts of unsaturated groups in the fully formed latex grafted alkyd polymer. The unsaturated moieties present in alkyd polymers are typically consumed during the free radical polymerization of the latex monomers, and are therefore not available for oxidative cure in the coatings compositions. Furthermore, since the latex aspect of the alkyd polymer is derived from a monomer, as opposed to a latex polymer, the alkyd polymer cannot completely incorporate the beneficial aspects of the latex polymer due to the relatively low molecular weight of the grafted species.

In light of the above, it would be desirable to obtain a latex modified alkyd composition in which the modified alkyd composition provides the benefits of both alkyd polymers and latex polymers, in a stable composition.

SUMMARY OF THE INVENTION

The invention provides modified alkyd polymers, and compositions thereof, in which the alkyd polymers are modified by incorporation of polyol and/or diol-containing latex compositions. In a further aspect, the invention provides methods of making such compositions. In a still further aspect, the invention relates to compositions formed from such modified alkyd compositions.

Advantages of the invention will be set forth in the description that follows, and further advantages will be apparent from the description, or may be learned by practice of the invention. The advantages of the invention will be realized and attained by means of the elements and combinations particularly pointed out in the appended claims. However, both the foregoing general description and the following detailed description are exemplary and explanatory only, and are not restrictive of the invention, as claimed.

DETAILED DESCRIPTION OF THE INVENTION

The present invention may be understood more readily by reference to the following detailed description of the invention, and to the Examples included therein.

Before the present compositions of matter and methods are disclosed and described, it is to be understood that this invention is not limited to specific synthetic methods or to particular formulations, and, as such, may vary from the disclosure. It is also to be understood that the terminology used is for the purpose of describing particular embodiments only, and is not intended to limit the scope of the invention.

The singular forms a, an and the include plural referents, unless the context clearly dictates otherwise.

Optional or optionally means that the subsequently described event or circumstances may or may not occur. The description includes instances where the event or circumstance occurs, and instances where it does not occur.

The polymeric particles herein may be produced via emulsion polymerization, dispersion polymerization, or supension polymerization.

Diol is a synonym for glycol or dihydric alcohol. Polyol is a polyhydric alcohol containing three or more hydroxyl groups.

Ranges may be expressed herein as from about one particular value, and/or to about another particular value. When such a range is expressed, it is to be understood that another embodiment is from the one particular value and/or to the other particular value.

Throughout this application, where publications are referenced, the disclosures of these publications in their entireties are intended to be incorporated by reference into this application, in order to more fully describe the state of the art to which the invention pertains.

The present invention relates to modified alkyd polymers in which the modification is accomplished by including a polyol-containing latex composition in an alkyd polymerization reaction. The polyol-containing latex composition may, in some aspects, also include some diol. Additionally, the invention relates to the addition of a diol-containing latex composition to an alkyd polymerization reaction. The diol-containing latex composition may, in some aspects, also include some polyol.

The latex compositions utilized herein comprise a latex polymer and a continuous phase, the continuous phase comprising a polyol and/or a diol component. As used herein, the latex composition includes latexes comprised of core shell and/or non-core shell latex polymers.

In one aspect, this invention concerns the preparation of a polyol-containing latex composition by emulsion polymerization, wherein the continuous phase comprises a polyol component, and wherein the composition may optionally comprise at least some diol.

The continuous phase of the polyol-containing latex compositions utilized in the alkyd polymerization reactions of the invention may contain one or more polyol components. Polyol components used in the continuous phase include, but are not limited to, one or more of glycerol, trimethylolpropane, trimethyolethane, pentaerythritol, 1,2,6-hexanetriol, sorbitol, 1,1,4,4-tetrakis(hydroxymethyl) cyclohexane, tris-(hydroxyethyl)isocyanurate, tripentaerythritol, and dipentaerythritol. In addition to low molecular weight polyols, higher molecular weight polyols (MW 400–3000), such as triols derived by condensing alkylene oxides having from 2 to 3 carbons, e.g., ethylene oxide or propylene oxide, with polyol initiators, having from 3 to 6 carbons, e.g., glycerol, can also be used.

In one aspect, the polyol component is present in an amount of from 10 to 100 weight %, based on the total weight of the continuous phase; still further, from 40 to 100 weight %, based on the total weight of the continuous phase; still further, from 75 to 100 weight %, based on the total weight of the continuous phase; still further, from 90 to 100 weight %, based on the total weight of the continuous phase; and, still further, 100 weight %, based on the total weight of this continuous phase. In a further aspect, the polyol-containing continuous phase consists essentially of the polyol component. Yet still further, the polyol component may be any of 5, 10, 15, 20, 25, 30, 35, 40, 45, 50, 55, 60, 65, 70, 75, 80, 85, 90, 95, 99, or 100 weight %, where any of the lower values may be used as the lower endpoint and any of the upper values may be used as the upper endpoint.

Where a diol component is present in the polyol-containing latex compositions herein, they may include, but are not limited to, one or more of an aliphatic or cycloaliphatic diol having from about 2 to about 10 carbon atoms. Diols may also include, but are not limited to, one or more of neopentyl glycol, ethylene diol, 1,3-trimethylene diol, propylene diol, tripropylene diol, 1,4-butanediol, 1,5-pentanediol, 1,6-hexanediol, 1,7-heptanediol, 1,8-octanediol, 1,9-nonanediol, neopentyl diol, cis- or trans-cyclohexanedimethanol, cis- or trans- 2,2,4,4-tetramethyl-1,3-cyclobutanediol, diethylene diol, 2,2,4-trimethyl-1,3-pentanediol, 2-methyl-1,3-propanediol, and 2-methyl-1,3-pentanediol.

In one aspect, the diol component is present with the polyol component in an amount of from 10 to 90 weight %, based on the total weight of the continuous phase, or from 25 to 90 weight %, based on the total weight of the continuous phase, from greater than 50 to 90 weight %, based on the total weight of the continuous phase, or from 75% to 90 weight %, based on the total weight of the continuous phase. In alternative aspects, the amount of diol in the polyol-containing latex compositions is from any of 15, 20, 25, 30, 35, 40, 45, 50, 55, 60, 65, 70, 75, 80, 85, or 90 weight % diol, where any value may be used as the lower endpoint and vice versa.

Other suitable polyol-containing latex compositions that may be used in the invention herein are described in detail in Attorney Docket Number 71323US01, filed concurrently herewith as a U.S. patent application. The disclosure of this application is herein incorporated by reference.

In a further aspect, the invention relates to the addition of a diol-containing latex composition to an alkyd polymerization reaction. Such diol latexes are described in detail in U.S. Pat. No. 6,197,878 B1, and U.S. application Ser. No. 09/668,449, the disclosures of which are herein incorporated by reference in their entireties.

The continuous phase of the polyol-containing and/or diol-containing latex compositions may also comprise a cosolvent. These cosolvents include, but are not limited to, one or more of water, methanol, ethanol, propanol, and n-butanol. The cosolvent may be present in the amount of less than 60 weight %, more or less than 40 weight % or more or less than 30%, 20%, 10%, or 5 weight %, based on the total weight of the continuous phase.

In one aspect, the alkyd polymerization reaction may include a mixture of a polyol latex composition and a diol latex composition.

The latex compositions of this invention may be prepared by emulsion polymerization, suspension polymerization or dispersion polymerization. The solids content of the polymerization reaction may be from 5 to 60 weight %, or from 20 to 50 weight %. Still further, the solids content of the reaction may be any of 1, 5, 10, 15, 20, 25, 30, 35, 40, 45, 50, 55, 60, 65, 70, 75, 80, 85, 90, 95, or 99 weight %, where any lower value may be utilized as the lower endpoint, and vice versa.

The latex compositions used in the invention may comprise a stabilizer, which may be either a surfactant or a sulfopolyester, or mixtures thereof.

When the stabilizer is a surfactant, the amount of surfactant utilized may vary. In specific aspects, the surfactant may be present at from 0.1 to 10 weight % of the latex composition. Still further, the amount of surfactant may be from 0.1 to 1.0 weight % or from 1.0 to 5.0 weight %. Still further, the amount of surfactant may be any of 0.5, 1.0, 1.5, 2.0, 2.5, 3.0, 3.5, 4.0, 4.5, or 5.0 weight %, where any lower value may be used with any higher value as endpoints. One of ordinary skill in the art would recognize that the type and amount of surfactant used in the latex compositions depends on the chosen monomer combinations and the polymerization conditions. Surfactants used in the latex compositions may be anionic, cationic, or nonionic surfactants. Anionic surfactants that may be used in the invention include surfactants such as one or more of alkali metal or ammonium salts of alkyl, aryl or alkylaryl sulfonates, sulfates, or phosphates. Further suitable nonionic surfactants include, but are not limited to, one or more of alkyl and alkylaryl polydiol ethers, such as ethoxylation products of lauryl, oleyl, or stearyl alcohols, alkyl phenol glycol ethers, including but not limited to, ethoxylation products of octyl or nonylphenol. Further suitable surfactants may be found in *McCutcheon's Volume I: Emulsifiers and Detergents* 1996 *North American Edition*, MC Publishing Co., Glen Rock, N.J., 1996.

The surfactant may or may not be reactive in the polymerization reaction. In one aspect, useful surfactants are the sulfate/sulfonate salts of nonyl phenol and alkyl alcohol ethoxylates. Surfactants may include, but are not limited to, one or more of polymerizable or nonpolymerizable alkyl ethoxylate sulfates, alkyl phenol ethoxylate sulfates, alkyl ethoxylates, and alkyl phenol ethoxylates.

When the stabilizer is a sulfopolyester, a low molecular weight sulfopolyester polymer may be utilized as a latex particle stabilizer in the latex compositions. When included in the latex compositions of the present invention, the sulfopolyester polymer can provide steric and ionic stabilization to maintain the latex particles suspended in the continuous phase. Such stabilization is believed to result from the anionically charged groups in the polyester polymer chain of the sulfopolyester polymer. Accordingly, there may be no need to include surfactant in the compositions because the sulfopolyester polymers take the place thereof. However, a mixture of surfactant and sulfopolyester may be utilized in some aspects.

The stabilizer may also comprise a sulfopolyester material. The sulfopolyester stabilizer may be present in the latex compositions at from 0.1 to 10 weight %. Still further, the amount of sulfopolyester may be from 1.0 to 10 weight % or from 1.0 weight % to 5.0 weight %. Still farther, the amount of sulfo-polyester may be from 0.5, 1.0, 1.5, 2.0, 2.5, 3.0, 3.5, 4.0, 4.5, or 5.0 weight %, where any lower value may be utilized with any upper value as endpoints. One of ordinary skill in the art would recognize that the type and amount of sulfo-polyester used in the emulsion polymerization will depend on the monomer combinations and the polymerization conditions being utilized.

The sulfopolyester polymers utilized as stabilizers of the latex compositions herein contain a sulfo group. In a separate aspect, the sulfopolyesters may be linear polymers dispersible in the latex compositions in the temperature range of from 40 to 90° C. The sulfopolyester polymers of the present invention may contain repeat units comprising a dicarboxylic acid, a diol, and a difunctional sulfo-monomer.

The monomers that may be used to form the latex polymers of the polyol-containing latexes may be broadly characterized as ethylenically unsaturated monomers. These include, but are not limited to, one or more of non-acid vinyl monomers and acid vinyl monomers. The latex polymers of the invention may be copolymers of non-acid vinyl monomers and acid monomers, mixtures thereof, and their derivatives. The latex polymers of the invention may also be homopolymers of ethylenically unsaturated monomers.

Suitable ethylenically unsaturated monomers that may be used to prepare the latex polymer include, but are not limited to, one or more of acetoacetoxy ethyl methacrylate, acetoacetoxy ethyl acrylate, methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethyl hexyl acrylate, isoprene, octyl acrylate, octyl methacrylate, iso-octyl acrylate, iso-octyl methacrylate, trimethyolpropyl triacrylate, styrene, α-methyl styrene, glycidyl methacrylate, carbodiimide methacrylate, $C_1$-$C_{18}$ alkyl crotonates, di-n-butyl maleate, α- or β-vinyl naphthalene, di-octylmaleate, allyl methacrylate, di-allyl maleate, di-allylmalonate, methyoxybutenyl methacrylate, isobornyl methacrylate, hydroxybutenyl methacrylate, hydroxyethyl (meth)acrylate, hydroxypropyl(meth)acrylate, acrylonitrile, vinyl chloride, vinylidene chloride, vinyl acetate, vinyl ethylene carbonate, epoxy butene, 3,4-dihydroxybutene, hydroxyethyl(meth)acrylate, methacrylamide, acrylamide, butyl acrylamide, ethyl acrylamide, butadiene, vinyl ester monomers, vinyl(meth)acrylates, isopropenyl(meth) acrylate, cycloaliphaticepoxy(meth)acrylates, ethylformamide, 4-vinyl-1,3-dioxolan-2-one, 2,2-dimethyl-4 vinyl-1,3-dioxolane, 3,4-di-acetoxy-1-butene, acrylic acid, methacrylic acid, itaconic acid, crotonic acid, and monovinyl adipate. Further monomers are described in *The Brandon Associates,* 2nd edition, 1992 Merrimack, N.H., and in *Polymers and Monomers*, the 1966–1997 Catalog from Polyscience, Inc., Warrington, Pa., U.S.A.

Specific monomers useful for making the latex polymer/ (co)polymer are ethylenically unsaturated monomers including, but not limited to, one or more of acrylates, methacrylates, vinylesters, styrene, styrene derivatives, vinyl chloride, vinylidene chloride, acrylonitrile, isoprene, and butadiene. In a further aspect, the latex polymer comprises (co)polymers made from monomers including, but not limited to, one or more of 2-ethyl-hexyl acrylate, styrene, butylacrylate, butylmethacrylate, ethylacrylate, methylmethacrylate, butadiene, and isoprene.

Further ethylenically unsaturated monomers that may be utilized include those that are suitable for forming latex polymers with reactive groups such as hydroxyl, carboxyl, and ester moieties that may be grafted onto the alkyd polymer backbone during a polycondensation reaction.

In one aspect, the molecular weight of the latex polymer is a weight average molecular weight (Mw) of from 1,000 to 1,000,000, as determined by gel permeation chromatography (GPC), or a number average molecular weight (Mn) of from 5000 to 250,000. Still further, the Mw of the latex polymer is greater than 10,000. In one aspect, the glass transition temperature ($T_g$) of the latex polymer is less than or equal to 170° C.

The latex compositions of this invention may be characterized as stabilized latexes in a continuous phase comprising a polyol component, a diol component, or a mixture thereof. A stable latex is defined for the purposes of this invention as one in which the particles are colloidally stable, i.e., the latex particles remain dispersed in the continuous phase for long periods of time, such as 24 hours, or 48 hours, or one week, or longer.

The latex polymer particles may generally have a spherical shape. As noted previously, the latex polymer utilized in the latex compositions of the present invention may be either a core shell polymer or a non core-shell polymer. When a core shell polymer is utilized, the polymers may be prepared in a core/shell fashion by staging the monomer addition. For example, the composition of the monomer feed of the polymerization may be changed over the course of the reaction in an abrupt fashion, resulting in a distinct core and shell portion to the polymer. In a further aspect, the latex polymer particles are not core shell polymers.

The latex compositions may contain a stabilizer (other than a surfactant and/or sulfo-polyester), or a stabilizer may not be present. Stabilizers suitable for use in the latex composition include, but are not limited to, one or more of an anionic stabilizer, a nonionic suspension stabilizer, and an amphoteric suspension stabilizer. The suspension stabilizer must be soluble in the continuous phase, but should also be substantially insoluble with the monomers. If present, the concentration of the suspension stabilizer is from 3 to 15 weight % of the monomers, or from 7 to 8 weight % of the monomers.

With respect to the alkyd polymers of the present invention, the fatty acid, fatty ester, or naturally occurring, partially saponified oil may be any fatty acid, fatty ester, or naturally occurring-partially saponified oil known in the art. In one aspect, at least one monobasic fatty acid, fatty ester, or naturally occurring, partially saponified oil is used and selected from the following formulae (I), (II), and (III):

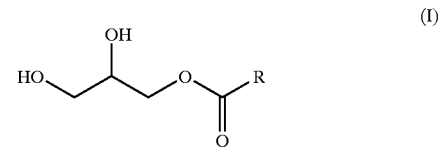

(I)

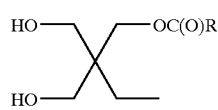

(II)

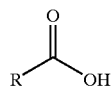

(III)

In formulae (I), (II), and (III), R is a saturated or unsaturated $C_8$-$C_{20}$ alkyl group. More preferably, R is one of the following unsaturated $C_{18}$ alkyl groups:

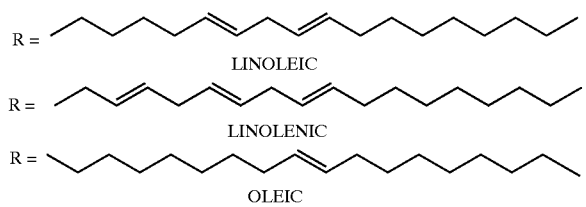

In another aspect, the monobasic fatty acid or fatty ester oil may be prepared by reacting an oil or a fatty acid with a polyol and/or a diol. Examples of suitable oils include, but are not limited to, one or more of sunflower oil, canola oil, dehydrated castor oil, coconut oil, corn oil, cottonseed oil, fish oil, linseed oil, oiticica oil, soya oil, tung oil, animal grease, castor oil, lard, palm kernel oil, peanut oil, perilla oil, safflower oil, tallow oil, and walnut oil. Suitable examples of fatty acids alone or as components of oil include, but are not limited to, one or more of tallow acid, soya acid, myristic acid, linseed acid, crotonic acid, versatic acid, coconut acid, tall oil fatty acid (e.g. PAMOLYNR® 200, commercially available from Eastman Chemical Co.), rosin acid, neodecanoic acid, neopentanoic acid, isostearic acid, 12-hydroxystearic acid, and cottonseed acid.

The source of polyol and/or diol for the alkyd resins of the present invention may be from the polyol-containing and/or diol-containing latexes, as described above. For example, in one aspect, the following materials may be combined and heated to form a latex modified alkyd composition having an acid number of from 0 to 100 mg KOH/g and a hydroxyl number of 30 to 200 mg KOH/g: A) from 5% to 80% of a polyol-containing latex having from 10% to 100 weight % polyol in the continuous phase; and B) from 20 to 95 weight % of one or more of a monobasic fatty acid, fatty acid ester, or a naturally occurring, partially saponified oil, where the weight amounts of components A)–B) are measured in relation to each other to total 100%. In a further aspect, the amount of components A)–B) that are combined and heated may be as follows: A) from 10 to 50 weight %; and B) from 20 to 50 weight %. Still further, the amount of A) may be any of 5, 10, 15, 20, 25, 30, 35, 40, 45, 50, 55, or 60 weight %, where any lower value may be paired with any upper value as endpoints. Yet further, the amount of B) present may be any of 5, 10, 15, 20, 25, 30, 35, 40, 45, 50, 55, or 60 weight %, where any lower upper may be paired with any upper value. In addition to the 10 to 100 weight % polyol in the continuous phase, the amount of these materials in the continuous phase may be as disclosed elsewhere herein.

As an alternative to including polyol-containing latexes in the alkyd polymerization reaction, the source of hydroxyl for the alkyd resins may be from the diol-containing latexes, as described above. For example, in one aspect, the following materials may be combined and heated to form a latex modified alkyd composition having an acid number of from 0 to 100 mg KOH/g and a hydroxyl number of 30 to 200 mg KOH/g: A) from 5 to 80 weight % of a diol-containing latex having from greater than 10 to 100 weight % total amount of diol in the continuous phase; and B) from 20 to 95 weight % of one or more of a monobasic fatty acid, fatty acid ester, or a naturally occurring, partially saponified oil, where the weight amounts of components A)–B) are measured in relation to each other to total 100 weight %. In a further aspect, the amount of components A)-B) that are combined and heated may be as follows: A) from 10 to 50 weight %; and B) from 20 to 50 weight %. Still further, the amount of A) may be any of 5, 10, 15, 20, 25, 30, 35, 40, 45, 50, 55, or 60 weight %, where any lower value may be paired with any upper value. Yet further, the amount of B) present may be any of 5, 10, 15, 20, 25, 30, 35, 40, 45, 50, 55, or 60 weight %, where any lower value may be paired with any upper value. In addition to the 10 to 100 weight % diol in the continuous phase, the amount of these materials in the continuous phase may be as disclosed elsewhere herein.

The latex modified alkyd composition may further comprise a polyfunctional carboxylic ("polycarboxylic") acid or polycarboxylic anhydride. The polycarboxylic acid or anhydride utilized in the invention may comprise, but is not limited to, one or more of malonic acid, glutaric acid, pimelic acid, suberic acid, azelaic acid, sebacic acid, succinic acid, adipic acid, phthalic acid, isophthalic acid, terephthalic acid, 1,4cyclohexanedicarboxylic acid, 1,3-cyclohexanedicarboxylic acid, hexahydrophthalic anhydride, tetrahydrophthalic anhydride, trimellitic acid, trimellitic anhydride, phthalic anhydride, maleic anhydride, fumaric acid, tricarballylic, 3,3'4,4'-benzophenone tetracarboxylic acid, 1,1,3-trimethyl-5-carboxyl (p-carboxyphenyl) indan, lower alkyl substituted phthalic acids, tetrahydrophthalic acid, and dimerized fatty acids. One of ordinary skill in the art will recognize that the anhydrides of the aforementioned polycarboxylic acids may also be utilized. The polycarboxylic acid or anhydride may be from 0 to 30 weight % as measured by total weight of components A) and B). Still further, the polycarboxylic acid or anhydride may be any of 1, 5, 10, 15, 20, and 25 weight %, as measured by total weight of components A) and B), where any lower value may be utilized with any upper value, and vice versa.

In one aspect, a monofunctional carboxylic ("monocarboxylic") acid may be utilized to prepare the latex modified alkyd compositions. The monocarboxylic acid may comprise one or more of benzoic acid, pelargonic acid, and 4-t-butylbenzoic acid. The amount of monocarboxylic acid may be from 0 to 10 weight %, as measured by the total weight of components A–B. Still further, the amount of monocarboxylic acid may be any of 0, 1, 2, 3, 4, 5, 6, 7, 8, 9, or 10 weight %, where the total amount of components present totals 100 weight %.

The acid number of the alkyd compositions prior to any neutralization, if any, will generally be from 0 to 100 mg KOH/g, and the hydroxyl number will be from 30 to 200 mg KOH/g.

Optionally, a catalyst may be used to promote the formation of the latex modified alkyd polymer composition. The catalyst may be any catalyst known in the art to be used in the formation of an alkyd composition. The catalyst may be an acid catalyst, such as, for example, FASCAT 4100. The amount of catalyst added promotes the formation of the latex modified alkyd composition, as described above, and may be determined by routine experimentation as understood by those skilled in the art. The catalyst may be added in amounts ranging from 0.01 to 1.00 weight %, based on the total amount of reactant.

In accordance with the invention herein, there may be a separate source of polyol and/or diol than that which is present in the latex compositions. Where there is additional polyol present over what is present in A and B, the amount of the additional polyol may be from 0 to 30 weight %, where the total amount of components totals 100 weight %. Still further, the amount of additional polyol may be any of 5, 10, 15, 20, or 25 weight %, where any upper value may be used with any lower value as endpoints. Where there is additional polyol present, the polyol may be added neat. Still further, the polyol may be added in the form of polyol latex described above. Where there is diol present over what may be present in A and B, the amount of the additional diol may be from 0 to 30 weight % components A and B. Still further, the amount of diol may be any of 5, 10, 15, 20, or 25 weight %, as measured by total weight of the components. The diol may be added neat. Still further, the diol may be added in the form of diol latex described above. One of ordinary skill in the art will recognize that the amount of polyol and/or diol added to the alkyd polmerization medium may vary in a number of different manners, without departing from the scope and the spirit of the invention.

In a further aspect, from 2 to 15 weight % of a sulfomonomer may be added as a reactant to the alkyd polymerization reaction, thereby providing a water dispersible latex composition. As such, the alkyd polymerization reaction may optionally contain a sulfomonomer. Still further, any of 1, 3, 5, 7, 9, 11, 13, 15, or 20 weight % of a sulfomonomer may be added to the latex composition where any upper value may be used with any lower value as an endpoint. Suitable sulfomonomers include, but are not limited to, one or more of 5-sodiosulfoisophthalic acid, dimethyl 5-sodioisophthalate, 5-lithiosulfoisophthalic acid, lithium 5-sulfoisophthalic acid, potassium 5-sulfoisophthalic acid, dimethyl potassium 5-sulfoisophthalate, and 3-sodiosulfobenzoic acid.

The latex modified alkyd compositions may be prepared at a temperature range of from 170 to 240° C., from 180 to 220° C., or from 190 to 210° C. In the polycondensation process, the polyol/diol latex is mixed with alkyd monomers, and the temperature may be raised to from 100 to 120° C., to remove a portion of water from the mixture. The reaction temperature is then raised to about 150° C. and the distillate collected. The reaction is allowed to continue at to 150 from 220° C. to collect the expected amount of the condensate. The reaction is terminated when the desired acid number is obtained. Alternatively, a two-stage method may be used by adding the fatty acid in the second stage after other reactants have been reacted. Further methods of making alkyd polymer compositions are disclosed in U.S. Pat. Nos. 5,378,757 and 5,530,059, the disclosures of which are incorporated herein by reference.

In a further aspect, a neutralizing step may be used, in which an alkaline material is added to the latex modified alkyd composition, thereby providing a water dispersible composition. In one aspect, the amount of alkaline material added is sufficient to neutralize from 50 to 100 weight % of the carboxyl end groups, and therefore provide an alkyd composition with an acid number of from 0 to 50 mg KOH/g. Still further, the acid number of the neutralized alkyd polymer may be any of 0, 5, 10, 15, 20, 25, 30, 45, 40, 45 50, 55, or 60 mg/KOH, where any lower value may be paired with any upper value, and vice versa. In separate aspects, the alkaline material may comprise, but is not limited to, one or more of ammonium hydroxide, diethylamine, triethylamine, disobutylamine, disoproplyamine, tributylamine, 2-amino-2-methyl-1-propanol, dimethyl-aminoethyl propanol, ethanolamine, diethanolamine, triethanolamine, N-N-dimethyl ethanolamine, N-methyl diethanolamine, morpholine, N-methyl morpholine, potassium hydroxide, sodium hydroxide, and lithium hydroxide.

The latex modified alkyd compositions of the present invention, in one aspect, are prepared from the latex compositions described herein, or mixtures of polyol and diol latexes, wherein the latex polymer in the compositions has a molecular weight of 10,000 or greater. In a further aspect, the monomers from which the latex particles are formed may have functional groups that can react in the polycondensation reaction from which the alkyd resins are prepared. Therefore, in an aspect specifically related to the alkyd compositions themselves (as opposed to the method of making the compositions), the monomers from which the alkyd polymers comprise a residue of a non-acid vinyl monomer include, but are not limited to, one or more of acetoacetoxy ethyl methacrylate, acetoacetoxy ethyl acrylate, methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethyl hexyl acrylate, isoprene, octyl acrylate, octyl methacrylate, iso-octyl acrylate, iso-octyl methacrylate, trimethyolpropyl triacrylate, glycidyl methacrylate, carbodiimide methacrylate, $C_1$-$C_{18}$ alkyl crotonates, di-n-butyl maleate, di-octylmaleate, allyl methacrylate, di-allyl maleate, di-allylmalonate, methyoxybutenyl methacrylate, isobornyl methacrylate, hydroxybutenyl methacrylate, hydroxyethyl (meth)acrylate, hydroxypropyl(meth)acrylate, vinyl acetate, vinyl ethylene carbonate, epoxy butene, 3,4-dihydroxybutene, hydroxyethyl(meth)acrylate, methacrylamide, acrylamide, butyl acrylamide, ethyl acrylamide, vinyl(meth)acrylates, isopropenyl(meth) acrylate, cycloaliphaticepoxy(meth)acrylates, ethylformamide, 4-vinyl-1,3-dioxolan-2-one, 2,2-dimethyl-4 vinyl-1,3-dioxolate or 3,4-di-acetoxy-1-butene.

The latex modified alkyd compositions of the invention are to be distinguished from typical latex modified alkyd polymers prepared by free radical polymerization, in which the latex monomers are polymerized and grafted onto alkyd backbones through the unsaturated moieties of the alkyds. No such grafting mechanisms typically occur in the present invention, since the modification of the alkyd polymers is achieved by polycondensation. One of ordinary skill in the art will recognize that in the polycondensation reaction, the unsaturated moieties of the alkyd typically do not participate in the reaction.

Alkyd polymers formed according to the invention have been found by the inventors to have excellent coating properties, because of a greater number of groups available for oxidative cure. Moreover, the latex modified alkyd polymer compositions herein are also to be distinguished from simple physical blends of alkyd polymers and latexes because, in contrast to a physical blend, the incorporation of the latex into the alkyd polymer matrix provides an alkyd polymer/latex polymer hybrid in which the latex is situated within the matrix of the alkyd polymer. As such, the alkyd polymer and latex of the present invention will be less likely to separate as in a physical blend of these two polymers. Further, unlike the physical blending process where no grafting occurs, the polycondensation blending process provides a method for the latex polymer having reactive groups such as hydroxyl, carboxyl, and ester moieties to be grafted onto the alkyd backbone. This novel process thereby provides a method for blending alkyd and latex with improved stability.

In yet a further aspect, the invention provides an enamel composition comprising: (a) from 10 to 90 weight % of the latex modified alkyd composition described above; (b) from 10 to 90 weight % of an organic solvent; and (c) a catalytic amount of a metal drier, wherein components (a) and (b) total 100 weight % of the enamel composition. In further aspects, the organic solvent may be any of 1, 5, 10, 15, 20, 25, 30, 35, 40, 45, 50, 55, 60, 65, 70, 75, 80, 85, 90, 95, or 99 weight % of the enamel composition, where any of the lower values may be used as a lower endpoint and any of the upper values used as an upper endpoint. Still further, the amount of the latex modified alkyd composition may be any of 1, 5, 10, 15, 20, 25, 30, 35, 40, 45, 50, 55, 60, 65, 70, 75, 80, 85, 90, 95, or 99 weight % of the enamel composition, where any lower value may be used with any upper value, and vice versa.

In a further aspect, the metal drier is a metal carboxylate, wherein the metal comprises one or more of cobalt, zirconium, calcium, manganese, and a rare earth metal. Mixtures of driers i.e. a drier system, may also be used.

In yet a further aspect, a coating composition may be provided. The coating composition may comprise: (a) from 35 to 90 weight % of the latex modified alkyd composition; (b) from 5 to 50 weight % of a crosslinker; and (c) optionally, an organic solvent at from greater than 0 to 60 weight %. Still further, the amount of the latex modified alkyd composition may be any of 25, 30, 35, 40, 45, 50, 55, 60, 65, 70, 75, 80, 85, 90, 95, or 99 weight % of the coating composition, where any of the lower values may be used as a lower endpoint, and any upper value used as an upper endpoint. In a further aspect, the amount of crosslinker may be any of 1, 5, 10, 15, 20, 25, 30, 35, 40, 45, 50, 55, or 60 weight %, where any of the lower values may be paired with any upper value. Still further, the amount of organic solvent may be any of 1, 5, 10, 15, 20, 25, 30, 35, 40, 45, 50, 55, or 60 weight % of the coating composition, where any of the lower values may be used as a lower endpoint, and any upper value may be used as an upper endpoint.

In one aspect, the organic solvent includes, but is not limited to, one or more of ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol mono-isobutyrate, ethylene glycol mono-octyl ether, diacetone alcohol, TEXANOL® ester alcohol (Eastman Chemical Company, Kingsport, Tenn.), and the like. Such solvents may also include reactive solvents such as, for example, diallyl phthalate, SANTOLINK XI-100® polyglycidyl allyl ether (Monsanto, St. Louis, Mo.), and others, as described in U.S. Pat. Nos. 5,349,026 and 5,371,148, the disclosures of which are herein incorporated by reference in their entireties.

As used herein, a crosslinker is a compound having a functional group that undergoes a crosslinking reaction with the hydroxyl group of the alkyd resin, such as an alkyl ether group, an isocyanate group, or the like. Examples of useful crosslinking agents include, but are not limited to, alkyletherized melamine resin, urea resin and benzoguanamine resin which are methylolated or modified with at least one of monohydric alcohols (with 1 to 5 carbon atoms) and compounds having a blocked isocyanate group. The compound having a blocked isocyanate group may be an isocyanate compound having its isocyanate group blocked with a blocking agent. Examples of useful isocyanate compounds include, but are not limited to, one or more of toluene diisocyanate, adduct of toluene diisocyanate and trimethylolpropane, diphenylmethane diisocyanate, methylene diisocyanate, hexamethylene diisocyanate, adduct of hexamethylene diisocyanate and trimethylolpropane, xylylene diisocyanate, lysine diisocyanate, etc. Examples of useful blocking agents include, but are not limited to, one or more of phenol, thiourea, methanol, propanol, n-butanol, t-butanol, ethyl acetoacetate, dimethyl malonate, ε-caprolactam, etc.

In yet a further aspect of the invention herein, a waterborne enamel composition is provided. In particular, the waterborne enamel composition comprises: a) from 10 to 90 weight % of the latex modified alkyd composition made from the methods described herein; b) from 10 to 90 weight % water; c) an alkaline material; d) a catalytic amount of a metal drier; and e) optionally, a water miscible organic solvent at from greater than 0 to 40 weight %. In another aspect, the amount of latex modifed alkyd composition comprises any of 1, 5, 10, 15, 20, 25, 30, 35, 40, 45, 50, 55, 60, 65, 70, 75, 80, 85, 90, 95, or 99 weight % of the enamel composition, where any of the lower values may be used as a lower endpoint and any upper value may be used as an upper endpoint. In a further aspect, the amount of water miscible organic solvent comprises any of 1, 5, 10, 15, 20, 25, 30, 35, 40, 45, or 50 weight %, where any of the lower values may be used as a lower endpoint and any upper value may be used as an upper endpoint. Still further, the amount of water may be any of 5, 10, 15, 20, 25, 30, 35, 40, 45, 50, 55, 60, 65, 70, 75, 80, 85, 90, 95, or 99 weight %, where any of the lower values may be used as a lower endpoint, and any upper values may be used as an upper endpoint.

In one aspect, the water miscible organic solvent comprises, but is not limited to, one or more of ethylene glycol monobutyl ether, ethylene glycol ethyl ether, propylene glycol butyl ether, dipropylene glycol methyl ether, and propylene glycol monomethyl ether. The alkaline materials may be as described previously with respect to the neutralizing agents.

In another aspect, where the latex modified alkyd composition contains a sulfomonomer as a reactant, the waterborne enamel composition may be prepared without the addition of the component c), an alkaline material. Thus, there is provided a waterborne enamel composition in the present invention comprising: a) from 10 to 90 weight % of the latex modified alkyd composition containing a sulfomonomer made from the method described herein; b) from 10 to 90 weight % water; c) a catalytic amount of a metal drier; and d) optionally, a water miscible organic solvent at from greater than 0 to 40 weight %.

The coating composition comprises the latex modified alkyd compositions of the invention, and may further contain one or more of water, a solvent, a pigment (organic or inorganic), and other additives or fillers known in the art. Such additives or fillers, include, but are not limited to, one or more of leveling, rheology, and flow control agents such as silicones, fluorocarbons, urethanes or cellulosics, extenders, reactive coalescing aids, such as those described in U.S. Pat. No. 5,349,026 (incorporated by reference herein in its entirety), flatting agents, pigment wetting and dispersing agents and surfactants, ultraviolet absorbers, ultraviolet light stabilizers, tinting pigments, extenders, defoaming and antifoaming agents, anti-settling, anti-sag and bodying agents, anti-skinning agents, anti-flooding and anti-floating agents, fungicides and mildewcides, corrosion inhibitors, thickening agents, plasticizers, reactive plasticizers, curing agents, and coalescing agents. Specific examples of such additives can be found in *Raw Materials Index*, published by the National Paint & Coatings Association, 1500 Rhode Island Avenue, NW, Washington, D.C. 20005, U.S.A. Further examples of such additives may be found in U.S. Pat. No. 5,371,148 (incorporated by reference herein in its entirety).

Examples of flatting agents include, but are not limited to, synthetic silica, available from the Davison Chemical Division of W. R. Grace & Company as SYLOID®; polypropylene, available from Hercules Inc., as HERCOFLAT®; and synthetic silicate, available from J. M. Huber Corporation, as ZEOLEX®.

Examples of dispersing agents include, but are not limited to, one or more of sodium bis(tridecyl) sulfosuccinnate, di(2-ethyl hexyl) sodium sulfosuccinnate, sodium dihexylsulfosuccinnate, sodium dicyclohexyl sulfosuccinnate, diamyl sodium sulfosuccinnate, sodium diisobutyl sulfosuccinnate, disodium iso-decyl sulfosuccinnate, disodium ethoxylated alcohol half ester of sulfosuccinic acid, disodium alkyl amido polyethoxy sulfosuccinnate, tetra-sodium N-(1,2-dicarboxyethyl)-N-octadecyl sulfosuccinnamate, disodium N-octasulfosuccinnamate, sulfated ethoxylated nonylphenol, and 2-amino-2-methyl-1-propanol.

Examples of viscosity, suspension, and flow control agents include, but are not limited to, one or more of polyaminoamide phosphate, high molecular weight carboxylic acid salts of polyamine amides, or alkylene amine salts of an unsaturated fatty acid, all available from BYK Chemie U.S.A. as ANTI TERRA®. Further examples include, but are not limited to, one or more of polysiloxane copolymers, polyacrylate solution, cellulose esters, hydroxyethyl cellulose, hydroxypropyl cellulose, polyamide wax, polyolefin wax, hydroxypropyl methyl cellulose, and polyethylene oxide.

Several proprietary antifoaming agents are commercially available and include, but are not limited to, one or more of BUBREAK® of Buckman Laboratories Inc.; BYK® of BYK Chemie, U.S.A.; FOAMASTER® and NOPCO® of Henkel Corp./Coating Chemicals; DREWPLUS® of the Drew Industrial Division of Ashland Chemical Company; TRYSOL® and TROYKYD® of Troy Chemical Corporation; and SAG® of Union Carbide Corporation.

Examples of U.V. absorbers and U.V. light stabilizers include, but are not limited to, one or more of substituted benzophenones, substituted benzotriazoles, hindered amines, and hindered benzoates, available from American Cyanamid Company as CYASORB UV®, and diethyl-3-acetyl-4-hydroxy-benzyl-phosphonate, 4-dodecyloxy-2-hydroxy benzophenone, and resorcinol monobenzoate.

EXAMPLES

The following examples are intended to provide those of ordinary skill in the art with a complete disclosure and description of how the compositions of matter and methods claimed herein are made and evaluated, and are not intended to limit the scope of what the inventors regard as their invention. Efforts have been made to ensure accuracy with respect to numbers (e.g., amounts, temperature, etc.) but some errors and deviations may have occurred. Unless indicated otherwise, parts are by weight, temperature is in ° C. or is at room temperature, and pressure is at or near atmospheric.

Example 1
Preparation of NPG-Based Latex

The low molecular weight sulfopolyester AQ-55 (Eastman Chemical Co., 40.0 g) was dispersed in a solution of water (160.0 g) and NPG (310.0 g) at 50 to 65° C. The resulting solution was then added to a 1 L jacketed reaction kettle equipped with a condenser, nitrogen gas, and a stirrer. Separately, a monomer mixture containing 2-ethyhexyl acrylate (185.0 g), methyl methacrylate (40.0 g), and methacrylic acid (15.0 g) was prepared in a 500 ml flask. In another container, 1.0 g of t-butyl hydroperoxide (70% in water), used as an initiator, was diluted with water (38.3 g). A solution of sodium formaldehyde sulfoxylate (SFS) (0.70 g) and water (10.0 g) was also prepared.

To the above reaction kettle were added 0.50 g of iron (II) sulfate heptahydrate (1.0 wt % in water), 0.40 g of ethylenediaminetetraacetic acid diammonium salt hydrate (EDTA), and a half portion of the above SFS solution. The reaction mixture was heated to 80° C. To the heated reactor, the monomer mixture and the initiator solution prepared above were pumped separately over a period of 2–3 hours. In the middle of the reaction, the other half portion of the SFS solution was added. After all the monomers and initiator were added, the reaction was held for an additional hour to complete the polymerization. The mixture was then allowed to cool to room temperature. The resulting latex was filtered through a multi-layered cheese-cloth. The solids content of the latex was determined to be 34.72% by drying in an oven at 100° C. The molecular weight was determined by GPC to be 15,263 (Mn, number average molecular weight) and 204,225 (Mw, weight average molecular weight). The particle size analysis showed a trimodal distribution centered at about 0.15, 4.00, and 40.00 µm.

Example 2
Preparation of Acrylic-Modified Alkyd Resin

To a three-neck, round-bottom flask equipped with a mechanical stirrer, a steam-jacketed partial condenser, a Dean-Stark trap, a nitrogen inlet, and a water condenser were charged trimethylolpropane (TMP), 69.68 g (0.52 mole); isophthalic acid (IPA), 100.91 g (0.61 mole); benzoic acid (BA), 15.18 g (0.12 mole); and Fascat 4100 (Atochem), 0.15 g. The mixture was heated to 100° C. to give a suspension into which the NPG-based latex, 72.82 g, prepared above in Example 1 was added. The reaction temperature was then raised to 110° C. and held for about 1.5 hours to give about 10 mL of the condensate (water). The reaction was allowed to continue at 120° C. for about one hour, at 130° C. for about 30 min., at 150° C. for about 1.5 hours, at 160° C. for about 30 min., at 180° C. for about four hours, at 190° C. for about two hours, and at 200° C. for about three hours. A total of 35 mL of the condensate was collected during this first stage of the reaction. The mixture was then allowed to cool to 170° C. and Pamolyn 200 (Eastman Chemical Co.), 104.53 g (0.36 mole), added. The reaction was allowed to continue at 170° C. for about one hour, at 180° C. for about one hour, at 190° C. for about 30 min., at 200° C. for about 1.5 hours, at 210° C. for about 30 min., and at 220° C. for about 30 min. A total of 42 mL of the condensate was obtained, and the acid number was determined to be 17 mg KOH/g. The mixture was allowed to cool to 130° C., and xylene (70 g) added to make a resin solution with 80% solids.

Example 3
Preparation of Water-Based Latex (Comparative Example)

The reaction in Example 1 was repeated, except that no NPG was added to the reaction mixture. The amounts of other reactants and the reaction procedure were kept the same. The resulting latex was determined to have 52.5% solids, a particle size of 169 nm (volume weighted mean), and molecular weight- Mn 36,292, Mw 438,215.

Example 4
Preparation of Acrylic-Modified Alkyd Resin Using Water-Based Latex (Comparative Example)

To a three-neck, round-bottom flask equipped with a mechanical stirrer, a steam-jacked partial condenser, a Dean-Stark trap, a nitrogen inlet, and a water condenser were charged the water-based latex of Example 3 (29.83 g) and NPG (18.87 g). The mixture was stirred at room temperature for 15–20 minutes to give a homogeneous solution. To the solution were then charged trimethylolpropane (TMP), 69.68 g (0.52 mole); isophthalic acid (IPA), 100.91 g (0.61 mole); benzoic acid (BA), 15.18 g (0.12 mole); and Fascat 4100 (Atochem), 0.15 g. The reaction was then carried out according to the procedure described in Example 2. However, it was found that coagulation of the latex particles occurred during resin synthesis, and the resulting polyester had significant amounts of gel particles.

Example 5
Preparation of Comparative Alkyd (Comparative Example)

To a three-neck, round-bottom flask equipped with a mechanical stirrer, a steam-jacked partial condenser, a Dean-Stark trap, a nitrogen inlet, and a water condenser were charged neopentyl glycol (NPG), 53.89 g (0.52 mole); trimethylolpropane (TMP), 139.37 g (1.04 mole); isophthalic acid (IPA), 201.82 g (1.22 mole); benzoic acid (BA), 30.37 g (0.25 mole); and Fascat 4100 (Atochem), 0.32 g. The mixture was allowed to react at 180° C.–220° C. until 47.0 g of the condensate (water) was obtained. After the mixture was cooled, Pamolyn 200, 209.06 g (0.72 mole), and Fascat 4100, 0.32 g, were then added. The reaction was allowed to continue at 190–220° C. until an acid number of 3.2 mg KOH/g was obtained. The resulting resin was allowed to cool to 120° C., and xylene (140.8 g) added to yield a resin solution with 80% non-volatiles.

Example 6
Preparation of Coating Formulation of NPG-Latex Modified Alkyd

A coating formulation was prepared by mixing the acrylic-modified alkyd resin 1 (80%, 31.50 g) prepared from Example 2 with xylene (12.50 g), a drier mixture (1.20 g), and a flow control agent FC-430 (3M Company) (20% solution in isopropanol, 0.12g). A control formulation was also prepared by utilizing the comparative alkyd of Example 5. The drier mixture was prepared by mixing Zirconium HEX-CEM (18%, OMG Americas), 1.67 g, cobalt (6%, Tenneco), 2.78 g, and methyl amyl ketone (MAK), 1.26 g.

The formulations were drawn down on cold rolled steel test panels (3 mil wet film) and allowed for air dry at room temperature. It was found that the acrylic-modified alkyd formulation had a through-dry time of 1.5 hours; whereas the control formulation had 4 hours.

Example 7
Preparation of Glycerol-Based Latex

This example illustrates the preparation of a latex having 2-EHA/MMA/MAA=77/17/6 weight %, and glycerol as the continuous phase.

The low molecular weight sulfopolyester AQ-55 (40.0 g) was dispersed in glycerol (470.0 g) at 80° C. The resulting solution was then added to a 1 L jacketed reaction kettle equipped with a condenser, nitrogen gas, and a stirrer. Separately, a monomer mixture containing 2-ethyhexyl acrylate (185.0 g), methyl methacrylate (40.0 g), and methacrylic acid (15.0 g) was prepared in a 500 ml flask. In another container, 1.0 g of t-butyl hydroperoxide (70% in water), used as an initiator, was mixed with glycerol (38.3 g). A solution of sodium formaldehyde sulfoxylate (SFS) (0.70 g), water (2.10 g), and glycerol (2.04 g) was also prepared.

To the above reaction kettle were added 0.52 g of iron (II) sulfate heptahydrate (1.0 wt % in water), 0.41 g of ethylenediaminetetraacetic acid diammonium salt hydrate (EDTA), and a portion (1.5 ml) of the above SFS solution. The reaction mixture was heated to 80° C. To the heated reactor, the monomer mixture and the initiator solution prepared above were pumped separately over a period of 2–3 hours. During the reaction, the rest of the SFS solution was added in three portions. After all the monomers and initiator were added, the reaction was held for an additional hour to complete the polymerization. The mixture was then allowed to cool to room temperature. The resulting latex was filtered through a multi-layered cheese-cloth. The molecular weight was determined by GPC to be 57,458 (Mn, number average molecular weight) and 464,803 (Mw, weight average molecular weight). The particle size analysis of the latex showed a bimodal particle size distribution centered at 0.17 and 56 $\mu$m.

Example 8
Preparation of Acrylic-Modified Alkyd Resin 2

To a three-neck, round-bottom flask equipped with a mechanical stirrer, a steam-jacketed partial condenser, a Dean-Stark trap, a nitrogen inlet, and a water condenser were charged neopentyl glycol (NPG), 9.37 g (0.09 mole); phthalic anhydride (PA), 35.31 g (0.24 mole); benzoic acid (BA), 7.62 g (0.06 mole); and Pamolyn 200, 85.60 g. The mixture was heated to 110° C. to give a suspension into which the glycerol-based latex (Example 7), 61.54 g, was added. The reaction temperature was then gradually raised to 170° C. and held for about two hours to give about 4.5 mL of the condensate (water). The reaction was allowed to continue at 180° C. for about one hour, at 190° C. for about 1.5 hours, and at 200° C. for about 30 min. A total of 9.5 mL of the condensate was collected during the reaction. The mixture was allowed to cool to 130° C., and xylene (47.48 g) added to make a resin solution with 80% solids. The acid number was determined to be 11 mg KOH/g.

The following example illustrates the preparation of a latex having 2-EHA/MMA/MAA=40/45/15 weight %, and glycerol/water=80/20 weight % as the continuous phase.

Example 9
Preparation of Glycerol-Based Latex

The low molecular weight sulfopolyester AQ-55 (40.0 g) was dispersed in glycerol (376.0 g) and water (94.0 g) at 80° C. The resulting solution was then added to a 1 L jacketed reaction kettle equipped with a condenser, nitrogen gas, and a stirrer. Separately, a monomer mixture containing 2-ethyhexyl acrylate (96.0 g), methyl methacrylate (108.0 g), and methacrylic acid (36.0 g) was prepared in a 500 ml flask. In another container, 1.0 g of t-butyl hydroperoxide (70% in water), used as an initiator, was mixed with glycerol (38.3 g). A solution of sodium formaldehyde sulfoxylate (SFS) (0.70 g), water (2.02 g), and glycerol (2.04 g) was also prepared.

To the above reaction kettle were added 0.52 g of iron (II) sulfate heptahydrate (1.0 wt % in water), 0.41 g of ethylenediaminetetraacetic acid diammonium salt hydrate (EDTA), and a portion (1.5 ml) of the above SFS solution.

The reaction mixture was heated to 80° C. To the heated reactor, the monomer mixture and the initiator solution prepared above were pumped separately over a period of 2–3 hours. During the reaction, the rest of the SFS solution was added in three portions. After all the monomers and initiator were added, the reaction was held for an additional hour to complete the polymerization. The mixture was then allowed to cool to room temperature. The resulting latex was filtered through a multi-layered cheese-cloth. The molecular weight was determined by GPC to be 62,289 (Mn, number average molecular weight) and 605,494 (Mw, weight average molecular weight). The particle size analysis of the latex showed a bimodal particle size distribution centered at 0.13 and 170 $\mu$m.

Example 10
Preparation of Acrylic-Modified Alkyd Resin 3

To a three-neck, round-bottom flask equipped with a mechanical stirrer, a steam-jacketed partial condenser, a Dean-Stark trap, a nitrogen inlet, and a water condenser were charged neopentyl glycol (NPG), 22.82 g (0.22 mole); phthalic anhydride (PA), 35.31 g (0.24 mole); benzoic acid (BA), 7.62 g (0.06 mole); and Pamolyn 200, 85.60 g. The mixture was heated to 120° C. to give a suspension into which the glycerol-based latex of Example 9, 60.47 g, was added. The reaction temperature was then gradually raised to 150° C. and held for about one hour, to give about 8.5 mL of the distillate (water). The reaction was allowed to continue at 170° C. for about one hour, at 190° C. for about 1.5 hours, and at 200° C. for about one hour. A total of 15.0 mL of the condensate was collected during the reaction. The mixture was allowed to cool to 130° C. and ethylene glycol monobutyl ether (49.2 g) added to make a resin solution with 80% solids. The acid number was determined to be 16.90 mg KOH/g.

Example 11
A. Preparation of Waterborne Acrylic-Modified Alkyd Resin 4

An adduct of neopentyl glycol and 5-sodiosulfoisophthalic acid (NPG/SIP) was first prepared by reacting NPG 755 g (7.26 mole), SIP (93.3%) 489 g (1.70 mole), and the catalyst, Fascat 4100, 1 g in a three-neck, round-bottom flask equipped with a mechanical stirrer, a steam-jacketed partial condenser, a Dean-Stark trap, a nitrogen inlet, and a water condenser. The reaction temperature was gradually increased from 130° C. to 190° C. in a period of four hours and the condensate (water) collected in the Dean-Stark trap. The reaction was allowed to continue until an acid number of 3 was obtained. A portion of the resulting product was used in the following step.

To a three-neck, round-bottom flask equipped with a mechanical stirrer, a steam-jacketed partial condenser, a Dean-Stark trap, a nitrogen inlet, and a water condenser were charged NPG/SIP, 38.82 g; phthalic anhydride (PA), 35.31 g (0.24 mole); benzoic acid (BA), 7.62 g (0.06 mole), and Pamolyn 200, 85.60 g. The mixture was heated to 110° C. to give a suspension into which the glycerol-based latex of Example 9, 60.63 g, was added. The reaction temperature was then raised to 140° C. and held for about one hour to give about 6.5 mL of the distillate (water). The reaction was allowed to continue at 160° C. for about 30 min., at 170° C. for about 30 min., at 180° C. for about 30 min., and at 190° C. for about one hour. A total of 15 mL of the condensate was collected during the reaction. The mixture was allowed to cool to 130° C., and ethylene glycol monobutyl ether (53.24 g) added to make a resin solution with 80% solids. The acid number was determined to be 33.60 mg KOH/g.

B. Alkyd Dispersion (4) Preparation.

A portion of the above resin (Example 11A), 129 g, was charged into a round-bottom flask equipped with a mechanical stirrer, a nitrogen inlet, and a water condenser. The resin was heated to 80° C., and water (115 g) added dropwise through an addition funnel. During the addition of water, triethylamine (8 g) was added in portions of 1–2 mL to yield a homogeneous dispersion with pH 7–9.

The following example illustrates the preparation of a latex having 2-EHA/Styrene/MMA/MAA=20/20/45/15 weight %, and glycerol/water=60/40 weight % as the continuous phase.

Example 12
Preparation of Glycerol-Based Latex

The low molecular weight sulfopolyester AQ-55 (40.0 g) was dispersed in glycerol (282.0 g) and water (182.0 g) at 80° C. The resulting solution was then added to a 1 L jacketed reaction kettle equipped with a condenser, nitrogen gas, and a stirrer. Separately, a monomer mixture containing 2-ethyhexyl acrylate (48.2 g), styrene (48.2 g), methyl methacrylate (108.6 g), and methacrylic acid (36.1 g) was prepared in a 500 ml flask. In another container, 1.0 g of t-butyl hydroperoxide (70% in water), used as an initiator, was mixed with glycerol (38.3 g). A solution of sodium formaldehyde sulfoxylate (SFS) (0.70 g), water (2.49 g), and glycerol (2.52 g) was also prepared.

To the above reaction kettle were added 0.52 g of iron (II) sulfate heptahydrate (1.0 wt % in water), 0.41 g of ethylenediaminetetraacetic acid diammonium salt hydrate (EDTA), and a portion (1.5 ml) of the above SFS solution. The reaction mixture was heated to 80° C. To the heated reactor, the monomer mixture and the initiator solution prepared above were pumped separately over a period of 2–3 hours. During the reaction, the rest of the SFS solution was added in three portions. After all the monomers and initiator were added, the reaction was held for an additional hour to complete the polymerization. The mixture was then allowed to cool to room temperature. The resulting latex was filtered through a multi-layered cheese-cloth. The molecular weight was determined by GPC to be 151,550 (Mn, number average molecular weight) and 696,757 (Mw, weight average molecular weight). The particle size analysis of the latex showed a major peak centered at 0.11 and a very small peak centered at 64 $\mu$m.

Example 13
A. Preparation of Waterborne Acrylic-Modified Alkyd Resin (5)

To a three-neck, round-bottom flask equipped with a mechanical stirrer, a steam-jacketed partial condenser, a Dean-Stark trap, a nitrogen inlet, and a water condenser were charged NPG/SIP, 38.92 g; phthalic anhydride (PA), 35.31 g (0.24 mole); and Pamolyn 200, 103.71 g. The mixture was heated to 110° C. to give a suspension into which the glycerol-based latex of Example 12, 78.60 g, was added. The reaction temperature was then raised to 130° C. and held for about one hour to give about 8.5 mL of the distillate (water). The reaction was allowed to continue at 140° C. for about 30 min., at 150° C. for about 30 min., at 160° C. for about one hour, at 170° C. for about one hour, and at 180° C. for about one hour. A total of 22 mL of the condensate was collected during the reaction. The mixture was allowed to cool to 130° C., and ethylene glycol monobutyl ether (58.63 g) added to make a resin solution with 80% solids. The acid number was determined to be 43.12 mg KOH/g.

B. Alkyd Dispersion (5)

A portion of the above resin (Example 13A), 129 g, was charged into a round-bottom flask equipped with a mechanical stirrer, a nitrogen inlet, and a water condenser. The resin was heated to 80° C. and water (116 g) added dropwise through an addition funnel. During the addition of water, triethylamine (9 g) was added in portions of 1–2 mL, to yield a homogeneous dispersion with pH 7–9.

The following example illustrates the preparation of a latex having 2-EHA/Styrene/MMA/MAA=20/20/45/15 weight %, and glycerol/water=60/40 weight % as the continuous phase. In addition, EDTA was not used in the preparation.

Example 14
Preparation of Glycerol-Based Latex

The low molecular weight sulfopolyester AQ-55 (40.0 g) was dispersed in glycerol (282.0 g) and water (182.0) at 80° C. The resulting solution was then added to a 1 L jacketed reaction kettle equipped with a condenser, nitrogen gas, and a stirrer. Separately, a monomer mixture containing 2-ethyhexyl acrylate (48.0 g), styrene (48.0), methyl methacrylate (108.1 g), and methacrylic acid (36.0 g) was prepared in a 500 ml flask. In another container, 1.2 g of t-butyl hydroperoxide (70% in water), used as an initiator, was mixed with water (38.3 g). A solution of sodium formaldehyde sulfoxylate (SFS) (0.70 g), water (3.02 g), and glycerol (3.03 g) was also prepared.

To the above reaction kettle were added 0.52 g of iron (II) sulfate heptahydrate (1.0 wt % in water) and a portion (1.5 ml) of the above SFS solution. The reaction mixture was heated to 80° C. To the heated reactor, the monomer mixture and the initiator solution prepared above were pumped separately over a period of 2–3 hours. During the reaction, the rest of the SFS solution was added in three portions. After all the monomers and initiator were added, the reaction was held for an additional hour to complete the polymerization. The mixture was then allowed to cool to room temperature. The resulting latex was filtered through a multi-layered cheese-cloth. The molecular weight was determined by GPC to be 61,872 (Mn, number average molecular weight) and 437,499 (Mw, weight average molecular weight). The particle size analysis of the latex showed a bimodal particle size distribution centered at about 0.14 and 65 μm.

Example 15
A. Preparation of Waterborne Acrylic-Modified Alkyd Resin 6

To a three-neck, round-bottom flask equipped with a mechanical stirrer, a steam-jacketed partial condenser, a Dean-Stark trap, a nitrogen inlet, and a water condenser were charged NPG/SIP, 38.92 g; phthalic anhydride (PA), 35.31 g (0.24 mole); and Pamolyn 200, 103.71 g. The mixture was heated to 110° C. to give a suspension into which the glycerol-based latex of Example 14, 89.52 g, was added. The reaction temperature was then raised to 130° C. and held for about one hour to give about 13.5 mL of the distillate (water). The reaction was allowed to continue at 140° C. for about 30 min., at 150° C. for about 30 min., at 170° C. for about 1.5 hours, at 190° C. for about one hour, and at 200° C. for about 30 min. A total of 35 mL of the condensate was collected during the reaction. The mixture was allowed to cool to 130° C., and ethylene glycol monobutyl ether (58.10 g) added to make a resin solution with 80% solids. The acid number was determined to be 18.47 mg KOH/g.

B. Alkyd Dispersion Preparation (6)

A portion of the above resin (Example 15A), 133.61 g, was charged into a round-bottom flask equipped with a mechanical stirrer, a nitrogen inlet, and a water condenser. The resin was heated to 80° C. and water (126 g) added dropwise through an addition funnel. During the addition of water, triethylamine (6 g) was added in portions of 1–2 mL to yield a homogeneous dispersion with pH 7–9.

Example 16
Preparation of Acrylic-Modified Alkyd Resin (7)

To a three-neck, round-bottom flask equipped with a mechanical stirrer, a steam-jacketed partial condenser, a Dean-Stark trap, a nitrogen inlet, and a water condenser were charged neopentyl glycol (NPG), 9.37 g (0.09 mole); phthalic anhydride (PA), 35.31 g (0.24 mole); benzoic acid (BA), 7.62 g (0.06 mole); and Pamolyn 200, 85.60 g. The mixture was heated to 110° C. to give a suspension into which the glycerol-based latex of Example 14, 110.43 g, was added. The reaction temperature was then raised to 130° C. and held for about one hour to give about 24.0 mL of the distillate (water). The reaction was allowed to continue at 150° C. for about 30 min., at 160° C. for about 30 min., at 170° C. for about 1.5 hours, at 190° C. for about 30 min., and at 200° C. for about 30 min. A total of 39 mL of the condensate was collected during the reaction. The mixture was allowed to cool to 130° C., and xylene (52.33 g) added to make a resin solution with 80% solids. The acid number was determined to be 22.17 mg KOH/g.

Example 17
Preparation of Solvent-Based Coating Formulations of Glycerol-Latex Modified Alkyds Various coating formulations were prepared by mixing, respectively, the acrylic-modified alkyd resins 2, 3, and 7 (80% solids, 12.70 g), prepared from Examples 8, 10, and 16, with xylene (4.17 g), a drier mixture (0.34 g), and a flow control agent (20% solution in isopropanol, 0.04 g), FC-430 (3M).

The drier mixture was prepared by mixing Cobalt HEX-CEM (12%, OMG Americas), 4.19 g, Zirconium HEX-CEM (18%, OMG Americas), and methyl amyl ketone (MAK), 9.95 g.

The formulations were drawn down on Leneta test papers (The Leneta Company) (3 mil wet film) and allowed to air dry at room temperature. It was found that the films remained tacky after two weeks.

Example 18
Preparation of Waterborne Coating Formulations of Glycerol-Latex Modified Alkyds Various coating formulations were prepared by mixing, respectively, the acrylic-modified alkyd dispersions 4, 5, and 6 (41% solids, 10.00 g), prepared from Examples 11, 13, and 15, with water (2 g), and the drier mixture as described in Example 16 (0.15 g). The formulations were drawn down on Leneta test papers (The Leneta Company) (3 mil wet film) and allowed to air dry at room temperature. It was found that the films remained tacky after two weeks.

The following example illustrates the preparation of a latex using a surfactant, Hitenol HS-20, instead of a sulfopolyester.

Example 19
Preparation of Glycerol-Based Latex

Hitenol HS-20 (5.3 g), polymerizable polyoxyethylene alkyl phenyl ether ammonium sulfate (available from DKS International), was dispersed in glycerol (282.0 g) and water (188.0 g) at 80° C. The resulting solution was then added to a 1 L jacketed reaction kettle equipped with a condenser, nitrogen gas, and a stirrer. Separately, a monomer mixture containing 2-ethyhexyl acrylate (48.0 g), styrene (48.0), methyl methacrylsate (108.0 g), and methacrylic acid (36.0 g), was prepared in a 500 ml flask. In another container, 1.0 g of t-butyl hydroperoxide (70% in water), used as an initiator, was mixed with water (38.3 g). A solution of sodium formaldehyde sulfoxylate (SFS) (0.7 g), water (3.0 g), and glycerol (3.0 g) was also prepared.

To the above reaction kettle were added 0.52 g of iron (II) sulfate heptahydrate (1.0 wt % in water), 0.41 g of ethylenediaminetetraacetic acid diammonium salt hydrate (EDTA), and a portion (1.5 ml) of the above SFS solution. The reaction mixture was heated to 80° C. To the heated reactor, the monomer mixture and the initiator solution prepared above were pumped separately over a period of 2–3 hours. During the reaction, the rest of the SFS solution was added in three portions. After all the monomers and initiator were added, the reaction was held for an addition hour to complete the polymerization. The mixture was then allowed to cool to room temperature. The resulting latex was filtered through a multi-layered cheese-cloth.

Example 20
Preparation of Acrylic-Modified Alkyd Resin (8)

To a three-neck, round-bottom flask equipped with a mechanical stirrer, a steam-jacketed partial condenser, a Dean-Stark trap, a nitrogen inlet, and a water condenser were charged neopentyl glycol (NPG), 9.37 g (0.09 mole); phthalic anhydride (PA), 35.31 g (0.24 mole); benzoic acid (BA), 7.62 g (0.06 mole); and Pamolyn 200, 85.60 g. The mixture was heated to 110° C. to give a suspension into which the glycerol-based latex of Example 19, 93.66 g, was added. The reaction temperature was gradually raised to 150° C. in a period of two hours to give about 29.0 mL of the distillate (water). The reaction was allowed to continue at 150° C. for about 90 min., at 160° C. for about 30 min., at 170° C. for about one hour, at 180° C. for about one hour, and at 200° C. for about 30 min. A total of 34 mL of the condensate was collected during the reaction. The mixture was allowed to cool to 130° C., and xylene (49.39 g) added to make a resin solution with 80% solids. The acid number was determined to be 27.66 mg KOH/g.

Example 21
A. Preparation of TMP-Based Latex

The low molecular weight sulfopolyester AQ-55 (40.0 g) was dispersed in trimethylolpropane (TMP, 282.0 g) and water (188.0) at 80° C. The resulting solution was then added to a 1 L jacketed reaction kettle equipped with a condenser, nitrogen gas, and a stirrer. Separately, a monomer mixture containing n-butyl acrylate (47.0 g), styrene (47.0), methyl methacrylate (94.0 g), and acrylic acid (12.0 g), was prepared in a 500 ml flask. In another container, 1.01 g of t-butyl hydroperoxide (70% in water), used as an initiator, was mixed with water (38.32 g). A solution of sodium formaldehyde sulfoxylate (SFS) (0.71 g) and water (6.02 g) was also prepared.

To the above reaction kettle were added 0.51 g of iron (II) sulfate heptahydrate (1.0 wt % in water) and a portion (1.5 ml) of the above SFS solution. The reaction mixture was heated to 80° C. To the heated reactor, the monomer mixture and the initiator solution prepared above were pumped separately over a period of 2–3 hours. During the reaction, the rest of the SFS solution was added in three portions. After all the monomers and initiator were added, the reaction was held for an additional hour to complete the polymerization. The mixture was then allowed to cool to room temperature. The resulting latex was filtered through a multi-layered cheese-cloth. The molecular weight was determined by GPC to be 60,700 (Mn, number average molecular weight) and a 442,000 (Mw, weight average molecular weight). The particle size analysis of the latex showed a bimodal particle size distribution centered at about 0.17 and 74 mm.

B. Preparation of Acrylic-Modified Alkyd Resin

To a three-neck, round-bottom flask equipped with a mechanical stirrer, a steam-jacketed partial condenser, a Dean-Stark trap, a nitrogen inlet, and a water condenser were charged pentaerythritol (PE), 26.05 g (0.19 mole); phthalic anhydride (PA), 38.77 g (0.26 mole); Pamolyn 200, 112.43 g; and the TMP based latex (Example 24A). The mixture was heated to 110° C. and the distillated (water) collected. The reaction temperature was gradually raised to 150° C. to give about 11.5 mL of the distillate. The reaction was allowed to continue at 150° C. for about 30 min., at 160° C. for about 30 min., at 170° C. for about 30 min., at 180° C. for about 30 min., at 190° C. for about one hour, at 200° C. for about 30 min., and at 220° C. for about one hour. A total of 26 mL of the condensate was collected (during the reaction. The mixture was allowed to cool to 130° C., and xylene (52.2 g) added to make a resin solution with 80% solids. The acid number was determined to be 7.26 mg KOH/g.

The invention has been described in detail with reference to specific embodiments. It will be understood, however, that variations and modifications can be made without departing from the scope and spirit of the invention.

We claim:

1. A process of preparing a latex-modified alkyd composition, comprising the steps of:
   a. combining
      1) from 5 to 80 weight % of a latex polymer composition comprising:
         (A) latex polymer particles comprising a residue of an ethylenically unsaturated monomer;
         (B) a stabilizer comprising one or more of a surfactant or a sulfopolyester; and
         (C) a liquid continuous phase comprising a diol component at from 10 to 100 weight % of the continuous phase and, optionally, a polyol component; and
      2) from 20 to 95 weight % of one or more of: a monobasic fatty acid, a fatty ester or a naturally occurring, partially saponified oil, as alkyd polymer precursors;
   wherein the weight % of the materials of step (a) is measured in relation to the total weight of the materials of step (a); and
   b. heating the materials of step (a) to result in a polymerization reaction, thereby providing a latex modified alkyd composition having an acid number of from 0 to 100 mg KOH/g, and a hydroxyl number of 30 to 200 mg KOH/g.

2. The process of claim 1, wherein:
   1) the latex polymer composition is present in an amount of from 10 to 50 weight %;
   2) the monobasic fatty acid, fatty acid ester, or naturally occurring, partially saponified oil is present in an amount of from 20 to 50 weight % of; and
   3) the materials of step (a) further comprise from 10 to 25 weight % of a polycarboxylic acid or a polycarboxylic acid anhydride.

3. The process of claim 1, wherein the monobasic fatty acid, fatty ester, or naturally occurring, partially saponified oil is derived from one or more of: tall oil, sunflower oil, canola oil, dehydrated castor oil, corn oil, cottonseed oil, fish oil, linseed oil, oiticica oil, soya oil, tung oil, animal grease, castor oil, lard, palm kernel oil, peanut oil, safflower, tallow oil or walnut oil.

4. The process of claim 1, wherein the monobasic fatty acid, fatty acid ester, or naturally occurring, partially saponified oil is derived from one or more of: tall oil, soya oil, or linseed oil.

5. The process of claim 1, wherein the diol comprises one or more of: neopentyl glycol, ethylene diol, 1,3-trimethylene diol, propylene diol, tripropylene diol, 1,4-butanediol, 1,5-pentanediol, 1,6 hexanediol, 1,7-heptanediol, 1,8-octanediol, 1,9-nonanediol, neopentyl diol, cis- or trans cyclohexanedimethanol, cis or trans 2,2,4,4-tetramethyl-1,3-cyclobutanediol or diethylene diol.

6. The process of claim 1, wherein the materials of step (a) further comprise from greater than 0 to 30 weight % of diol, in addition to the diol in the liquid continuous phase.

7. The process of claim 1, wherein the materials of step (a) further comprise polyol in an amount of from greater than 0 to 30 weight %, in addition to any polyol in the latex polymer composition.

8. The process of claim 1, wherein the polyol comprises one or more of: glycerol, trimethylolethane, trimethylolpropane, pentaerythritol, sorbitol, 1,2,6-hexanetriol, 1,1,4,4-tetrakis(hydroxymethyl)cyclohexane, tris(hydroxyethyl) isocyanurate, tripentaerythritol or dipentaerythritol.

9. The process of claim 7, wherein the additional polyol is charged as a polyol latex composition.

10. The process of claim 1, wherein the stabilizer comprises a surfactant present in an amount of from greater than 0 to 2 weight % of the latex composition.

11. The process of claim 1, wherein the stabilizer comprises a surfactant comprising one or more of: a polymerizable or nonpolymerizable alkyl ethoxylate sulfate, alkyl phenol ethoxylate sulfate, alkyl ethoxylate, or alkyl phenol ethoxylate.

12. The process of claim 1, wherein the stabilizer comprises a sulfo-polyester present in an amount of from 1 to 10 weight % of the latex composition.

13. The process of claim 1, wherein the stabilizer comprises sulfo-polyester residues of a polycarboxylic acid, a diol, and a difunctional sulfo-monomer.

14. The process of claim 13, wherein the difunctional sulfo-monomer comprises from 8 mole % to 25 mole %, based on 100 mole % polycarboxylic acid.

15. The process of claim 1, wherein the ethylenically unsaturated monomer comprises one or more of: acetoacetoxy ethyl methacrylate, acetoacetoxy ethyl acrylate, methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethyl hexyl acrylate, isoprene, octyl acrylate, octyl methacrylate, iso-octyl acrylate, iso-octyl methacrylate, trimethyolpropyl triacrylate, styrene, a-methyl styrene, glycidyl methacrylate, carbodiimide methacrylate, $C_1$-$C_{18}$ alkyl crotonates, di-n-butyl maleate, α- or β-vinyl naphthalene, di-octylmaleate, allyl methacrylate, di-allyl maleate, di-allylmalonate, methyoxybutenyl methacrylate, isobornyl methacrylate, hydroxybutenyl methacrylate, hydroxyethyl(meth)acrylate, hydroxypropyl(meth)acrylate, vinyl acetate, vinyl ethylene carbonate, epoxy butene, 3,4-dihydroxybutene, hydroxyethyl(meth)acrylate, methacrylamide, acrylamide, butyl acrylamide, ethyl acrylamide, vinyl(meth)acrylates, isopropenyl(meth)acrylate, cycloaliphaticepoxy(meth) acrylates, ethylformamide, 4-vinyl-1,3-dioxolan-2-one, 2,2-dimethyl-4 vinyl-1,3-dioxolate, 3,4-di-acetoxy-1-butene, acrylic acid, methacrylic acid, itaconic acid, crotonic acid or monovinyl adipate.

16. The process of claim 1, wherein the ethylenically unsaturated monomer comprises one or more of: methyl (meth)acrylate, butyl acrylate, 2-ethyl hexyl acrylate, styrene, methacrylic acid, acrylic acid, or hydroxyethyl (meth)acrylate.

17. The process of claim 1, wherein the materials of step (a) further comprise a polycarboxylic acid or polycarboxylic acid anhydride, present in an amount of from greater than 0 to 30 weight %, as measured by the total weight of the materials of step (a).

18. The process of claim 17, wherein the polycarboxylic acid or polycarboxylic acid anhydride comprises one or more of: malonic acid, glutaric acid, pimelic acid, suberic acid, azelaic acid, sebacic acid, succinic acid, adipic acid, phthalic acid, isophthalic acid, terephthalic acid, 1,4cyclohexanedicarboxylic acid, 1,3-cyclohexanedicarboxylic acid, hexahydrophthalic anhydride, tetrahydrophthalic anhydride, trimellitic acid, trimellitic anhydride, phthalic anhydride, maleic anhydride, fumaric acid, tricarballylic, 3,3'4,4'-benzophenone tetracarboxylic acid, 1,1,3trimethyl-5-carboxyl (p-carboxyphenyl) indan, lower alkyl substituted phthalic acids, tetrahydrophthalic acid or dimerized fatty acids.

19. The process of claim 17, wherein the polycarboxylic acid or polycarboxylic acid anhydride comprises one or more of: isophthalic acid, phthalic anhydride, adipic acid, or 1,4-cyclohexanepolycarboxylic acid.

20. The process of claim 1, wherein the materials of step (a) further comprise a monocarboxylic acid, present in an amount of from greater than 0 to 10 weight %, as measured by the total weight of the materials of step (a).

21. The process of claim 20, wherein the monocarboxylic acid comprises one or more of: benzoic acid, pelargonic acid, or 4-t-butylbenzoic acid.

22. The process of claim 1, further comprising a neutralizing step wherein an alkaline material is added to the alkyd composition, thereby providing an alkyd composition with an acid number of from 0 to 50 mgKOH/g.

23. The process of claim 22, wherein the alkaline material comprises one or more of: ammonium hydroxide, diethylamine, triethylamine, diisobutylamine, diisoproplyamine, tributylamine, 2-amino-2-methyl-1-propanol, dimethyl-aminoethyl propanol, ethanolamine, diethanolamine, triethanolamine, N-N-dimethyl ethanolamine, N-methyl diethanolamine, morpholine, N-methyl morpholine, potassium hydroxide, sodium hydroxide or lithium hydroxide.

24. The process of claim 22, wherein the alkaline material comprises one or more of: triethylamine, N,N-dimethylethanolamine, or ammonium ion.

25. The process of claim 1, wherein the materials of step (a) further comprise from 2 to 15 weight % of a sulfomonomer alkyd polymer precursor, as measured by a total weight of the alkyd polymer precursors, thereby providing a water dispersible latex modified alkyd composition.

26. The process of claim 25, wherein the sulfomonomer comprises one or more of: 5-sodiosulfoisophthalic acid, dimethyl 5-sodioisophthalate, 5-lithiosulfoisophthalic acid, lithium 5-sulfoisophthalic acid, potassium 5-sulfoisophthalic acid, dimethyl potassium 5-sulfoisophthalate, or 3-sodiosulfobenzoic acid.

27. A product prepared by the process of claim 1.

28. An article coated with the product of claim 27.

29. A latex-modified alkyd composition, comprising the reaction product of:
   a) from 5 to 80 weight % of a latex polymer composition comprising:
      1) latex polymer particles comprising a residue of an ethylenically unsaturated monomer, wherein the latex polymer particles have a molecular weight of 10,000 or greater;
      2) a stabilizer comprising one or more of a surfactant or a sulfopolyester; and
      3) a liquid continuous phase comprising a diol component present in an amount of from greater than 10 to 100 weight % of the continuous phase, and, optionally, further comprising a polyol component,
   b) from 20 to 90 weight % of a monobasic fatty acid, a fatty ester, or a naturally occurring, partially saponified oil; and
   c) optionally, at least one or more of: a polycarboxylic acid or a polycarboxylic acid anhydride, a monocarboxylic acid, or a sulfomonomer; wherein the weight % of components a)–c) is measured in relation to the total weight of components a)–c).

30. The composition of claim 29, wherein:
   a. the latex polymer composition is present in an amount of from 10 to 50 weight %;
   b. the monobasic fatty acid, fatty acid ester, or naturally occurring, partially saponified oil is present in an amount of from 20 to 50 weight %; and
   c. the polycarboxylic acid or polycarboxylic acid anhydride is present in an amount of from 10 to 25 weight %.

31. The composition of claim 29, wherein the monobasic fatty acid, fatty ester, or naturally occurring, partially saponified oil is derived from one or more of: tall oil, sunflower oil, canola oil, dehydrated castor oil, corn oil, cottonseed oil, fish oil, linseed oil, oiticica oil, soya oil, tung oil, animal grease, castor oil, lard, palm kernel oil, peanut oil, safflower, tallow oil or walnut oil.

32. The composition of claim 29, wherein the monobasic fatty acid the fatty acid ester, or the naturally occurring, partially saponified oil is derived from one or more of: tall oil, soya oil, or linseed oil.

33. The composition of claim 29, wherein the diol component of the latex polymer composition comprises one or more of: neopentyl glycol, ethylene diol, 1,3-trimethylene diol, propylene diol, tripropylene diol, 1,4-butanediol, 1,5-pentanediol, 1,6 hexanediol, 1,7-heptanediol, 1,8-octanediol, 1,9-nonanediol, neopentyl diol, cis- or trans cyclohexanedimethanol, cis or trans 2,2,4,4-tetramethyl-I 3-cyclobutanediol or diethylene diol.

34. The composition of claim 29, wherein the materials reacted further comprise from greater than 0 to 30 weight % of diol, in addition to the diol in the latex polymer composition.

35. The composition of claim 29, wherein the materials reacted further comprise from greater than 0 to 30 weight % of polyol, in addition to any polyol in the latex polymer composition.

36. The process of claim 29, wherein the polyol comprises one or more of glycerol, trimethylolethane, trimethylolpropane, pentaerythritol, sorbitol, 1,26-hexanetriol, 1,1,4,4 tetrakis(hydroxymethyl)cyclohexane, tris(hydroxyethyl) isocyanurate, tripentaerythritol, or dipentaerythritol.

37. The composition of claim 35, wherein the additional polyol is charged as a polyol latex composition.

38. The composition of claim 29, wherein the stabilizer comprises a surfactant present in an amount of from greater than 0 to 2 weight % of the latex composition.

39. The composition of claim 29, wherein the stabilizer comprises a surfactant comprising one or more of: a polymerizable or nonpolymerizable alkyl ethoxylate sulfate, an alkyl phenol ethoxylate sulfate, an alkyl ethoxylate, or an alkyl phenol ethoxylate.

40. The composition of claim 29, wherein the stabilizer comprises a sulfopolyester present in an amount of from 1 to 10 weight % of the latex composition.

41. The composition of claim 29, wherein the stabilizer comprises a sulfopolyester comprising residues of a polycarboxylic acid, a diol, and a difunctional sulfo-monomer.

42. The composition of claim 41, wherein the difunctinal sulfo-monomer comprises from 8 mole % to 25 mole %, based on 100 mole % polycarboxylic acid.

43. The composition of claim 29, wherein the ethylenically unsaturated monomer comprises one or more of: acetoacetoxy ethyl methacrylate, acetoacetoxy ethyl acrylate, methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethyl hexyl acrylate, isoprene, octyl acrylate, octyl methacrylate, iso-octyl acrylate, iso-octyl methacrylate, trimethylolpropyl triacrylate, glycidyl methacrylate, carbodiimide methacrylate, $C_1$-$C_{18}$ alkyl crotonates, di-n-butyl maleate, di-octylmaleate, allyl methacrylate, di-allyl maleate, d 1-allylmalonate, methyoxybutenyl methacrylate, isobornyl methacrylate, hydroxybutenyl methacrylate, hydroxyethyl (meth)acrylate, hydroxypropyl (meth)acrylate, vinyl acetate, vinyl ethylene carbonate, epoxy butene, 3,4-dihydroxybutene, hydroxyethyl(meth)acrylate, methacrylamide, acrylamide, butyl acrylamide, ethyl acrylamide, vinyl(meth)acrylates, isopropenyl(meth) acrylate, cycloaliphaticepoxy(meth)acrylates, ethylformamide, 4-vinyl-1,3-dioxolan-2-one, 2,2-dimethyl-4 vinyl-1,3-dioxolate, 3,4-di-acetoxy-1-butene acrylic acid, methacrylic acid, itaconic acid, crotonic acid or monovinyl adipate.

44. The composition of claim 29, wherein the ethylenically unsaturated monomer comprises one or more of: butyl acrylate, 2-ethyl hexyl acrylate, methacrylic acid, acrylic acid or hydroxyethyl (meth)acrylate.

45. The composition of claim 29, wherein the polycarboxylic acid or polycarboxylic acid anhydride is present in an amount of from greater than 0 to 30 weight %, as measured by a total weight of the components in the latex modified alkyd composition.

46. The composition of claim 45, wherein the polycarboxylic acid or polycarboxylic acid anhydride comprises one or more of: malonic acid, glutaric acid, pimelic acid, suberic acid, azelaic acid, sebacic acid, succinic acid, adipic acid, phthalic acid, isophthalic acid, terephthalic acid, 1,4cyclohexanedicarboxylic acid, 1,3-cyclohexanedicarboxylic acid, hexahydrophthalic anhydride, tetrahydrophthalic anhydride, trimellitic acid, trimellitic anhydride, phthalic anhydride, maleic anhydride, fumaric acid, tricarballylic, 3,3'4,4'-benzophenone tetracarboxylic acid, 1,1,3-trimethyl-5-carboxyl (p-carboxyphenyl) indan, lower alkyl substituted phthalic acids, tetrahydrophthalic acid, or dimerized fatty acids.

47. The composition of claim 45, wherein the polycarboxylic acid or polycarboxylic acid anhydride comprises one or more of: isophthalic acid, phthalic anhydride, adipic acid or 1,4-cyclohexanepolycarboxylic acid.

48. The composition of claim 29, wherein the monocarboxylic acid is present in an amount of from greater than 0 to 10 weight %, as measured by the total weight of components present in the latex modified alkyd composition.

49. The composition of claim 48, wherein the monocarboxylic acid comprises one or more of: benzoic acid, pelargonic acid or 4-t-butylbenzoic acid.

50. The composition of claim 29, wherein the alkyd has an acid number of from 0 to 100 mg KOH/g.

51. The composition of claim 29, wherein the sulfomonomer is present in an amount of from 2 to 15 weight %.

52. An enamel composition comprising:
   a. from 10 to 90 weight % of the latex-modified alkyd composition of claim 29;
   b. from 10 to 90 weight % of an organic solvent; and
   c. a catalytic amount of a metal drier; wherein components a) and b) total 100 weight % of the enamel composition.

53. The composition of claim 52, wherein the metal drier is a metal carboxylate, and wherein the metal comprises one or more of: cobalt, zirconium, calcium, manganese or a rare earth metal.

54. A coating composition comprising:
   a. from 35 to 90 weight % of the latex-modified alkyd composition of claim 29;
   b. from 5 to 50 weight % of a crosslinker; and
   c. optionally, an organic solvent, present in an amount of from greater than 0 to 60 weight %.

55. The coating composition of claim 54, wherein the organic solvent comprises one or more of: xylene, mineral spirits, methyl amyl ketone, toluene, n-butanol, 2-butanol, 2-butoxyethanol, ethyl-3-ethoxy-propionate, 2-ethylhexanol, n-butyl, isobutyl acetate, n-propyl acetate or isopropyl acetate.

56. An article coated with the composition of claim 29.

57. The article of claim 56, wherein the article is selected from the group consisting of metal, paper, and plastic.

58. A waterborne enamel composition, comprising:
   a) from 10 to 90 weight % of the latex modified alkyd composition of claim 29;
   b) from 10 to 90 weight % water;
   c) an alkaline material;
   d) a catalytic amount of a metal drier; and
   e) optionally, a water miscible organic solvent present in an amount of from greater than 0 to 40 weight %.

59. The waterborne enamel composition of claim 58, wherein the water miscible organic solvent comprises one or more of ethylene glycol monobutyl ether, ethylene glycol ethyl ether, propylene glycol butyl ether, dipropylene glycol methyl ether or propylene glycol monomethyl ether.

60. The waterborne enamel composition of claim 58, wherein the alkaline material comprises one or more of: ammonium hydroxide, diethylamine, triethylamine, diisobutylamine, diisoproplyamine, tributylamine, 2-amino-2-methyl-1-propanol, dimethyl-aminoethyl propanol, ethanolamine, diethanolamine, triethanolamine, N-N-dimethyl ethanolamine, N-methyl diethanolamine, morpholine, N-methyl morpholine, potassium hydroxide, sodium hydroxide or lithium hydroxide.

61. A waterborne enamel composition comprising:
   a) from 10 to 90 weight % of the latex modified alkyd composition of claim 51:
   b) from 10 to 90 weight % water;
   c) a catalytic amount of metal drier; and
   d) optionally, a water miscible organic solvent in an amount of from greater than 0 to 40 weight %.

62. An article coated with the composition of claim 58.

63. The article of claim 61, wherein the article is selected from the group consisting of metal, paper, and plastic.

64. The article of claim 61, further comprising a crosslinker comprising one or more of an isocyanate-containing material or a melamine-formaldehyde resin.

* * * * *